(12) United States Patent
Swenson

(10) Patent No.: US 10,772,415 B1
(45) Date of Patent: Sep. 15, 2020

(54) BEVERAGE CARTON CARRYING ASSEMBLY

(71) Applicant: Gary Swenson, Columbus, OH (US)

(72) Inventor: Gary Swenson, Columbus, OH (US)

( * ) Notice: Subject to any disclaimer, the term of this patent is extended or adjusted under 35 U.S.C. 154(b) by 0 days.

(21) Appl. No.: 16/660,907

(22) Filed: Oct. 23, 2019

(51) Int. Cl.
*A45F 5/10* (2006.01)
*B65G 7/12* (2006.01)

(52) U.S. Cl.
CPC ............. *A45F 5/102* (2013.01); *B65G 7/12* (2013.01)

(58) Field of Classification Search
CPC .............. A45F 5/102; A45F 2005/1033; A45F 2005/1053; B65G 7/12
USPC .............................. 294/173, 15, 26, 159, 145
See application file for complete search history.

(56) References Cited

U.S. PATENT DOCUMENTS

| | | | |
|---|---|---|---|
| 1,237,788 A * | 8/1917 | Keister ................... | B65G 7/12 294/15 |
| 3,083,886 A | 4/1963 | Fry | |
| 3,251,622 A * | 5/1966 | Miller ................... | A47J 45/075 294/33 |
| 3,520,570 A * | 7/1970 | Christopher ............... | A45F 5/10 294/27.1 |
| 4,494,788 A * | 1/1985 | Altemose .................. | A45F 5/10 294/159 |
| 4,923,082 A | 5/1990 | Bird | |
| 4,993,767 A | 2/1991 | Song | |
| 5,181,757 A * | 1/1993 | Montoya ............... | A45F 5/1026 294/159 |
| 5,447,259 A | 9/1995 | Erickson | |
| 5,645,306 A | 7/1997 | Kosteniuk | |
| 6,382,691 B2 * | 5/2002 | Hazelton ................... | A45F 5/10 248/210 |
| 7,306,272 B2 * | 12/2007 | Riness ..................... | B65G 7/12 294/145 |
| 7,331,622 B2 | 2/2008 | Sewell | |
| 7,588,274 B2 | 9/2009 | Worthington | |
| 9,242,755 B1 | 1/2016 | Giacobone | |

FOREIGN PATENT DOCUMENTS

WO    WO2008005694    1/2008

* cited by examiner

Primary Examiner — Dean J Kramer

(57) ABSTRACT

A beverage carton carrying assembly for carrying a pair of beverage cartons includes a panel and a grip that is coupled to the panel for gripping. A pair of supports is each coupled to and extends away from the panel. Each of the supports is extendable through a gripping slot in a respective pair of beverage cartons. Thus, each of the supports lifts the beverage cartons when the grip is lifted for carrying the beverage cartons.

5 Claims, 4 Drawing Sheets

BEVERAGE CARTON CARRYING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to carrying devices and more particularly pertains to a new carrying device for carrying a pair of beverage cartons.

(2) Description of Related Art Including Information Disclosed Under 37 CFR 1.97 and 1.98

The prior art relates to carrying devices.

BRIEF SUMMARY OF THE INVENTION

An embodiment of the disclosure meets the needs presented above by generally comprising a panel and a grip that is coupled to the panel for gripping. A pair of supports is each is coupled to and extends away from the panel. Each of the supports is extendable through a gripping slot in a respective pair of beverage cartons. Thus, each of the supports lifts the beverage cartons when the grip is lifted for carrying the beverage cartons.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
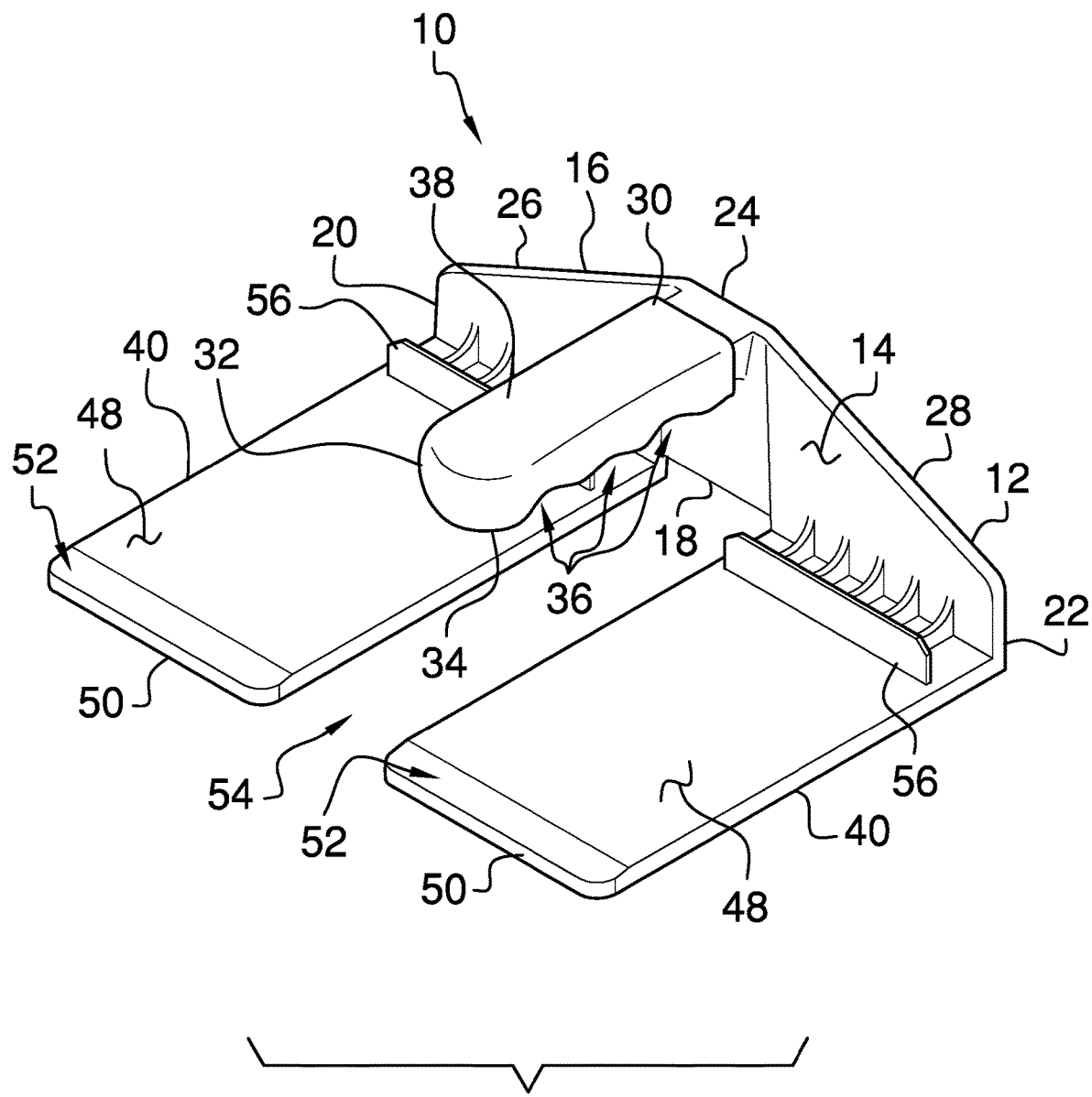
FIG. 1 is a top perspective view of a beverage carton carrying assembly according to an embodiment of the disclosure.
Figure 2:
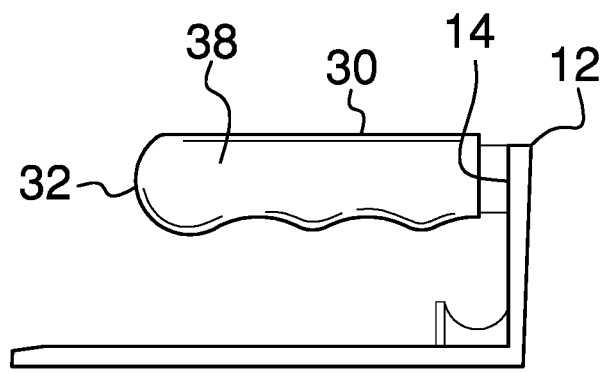
FIG. 2 is a right side view of an embodiment of the disclosure.
Figure 3:
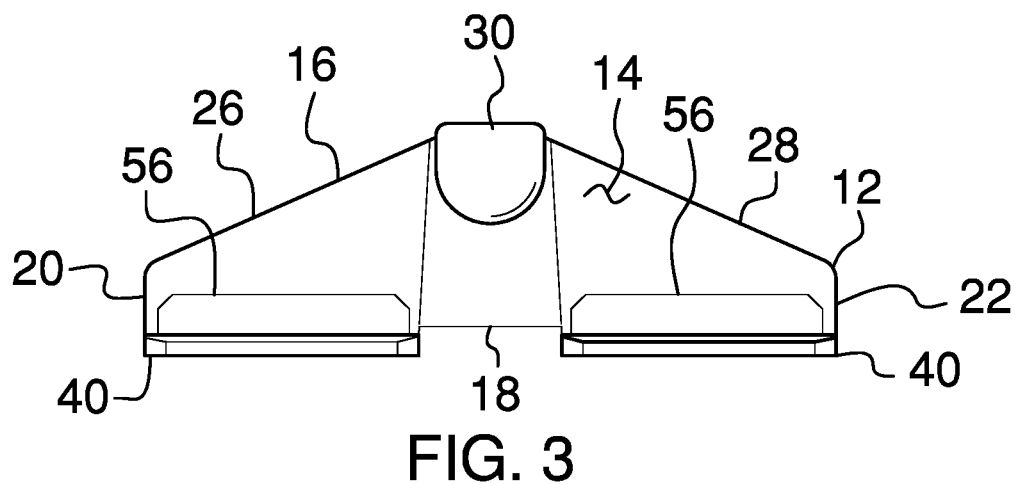
FIG. 3 is a front view of an embodiment of the disclosure.
Figure 4:
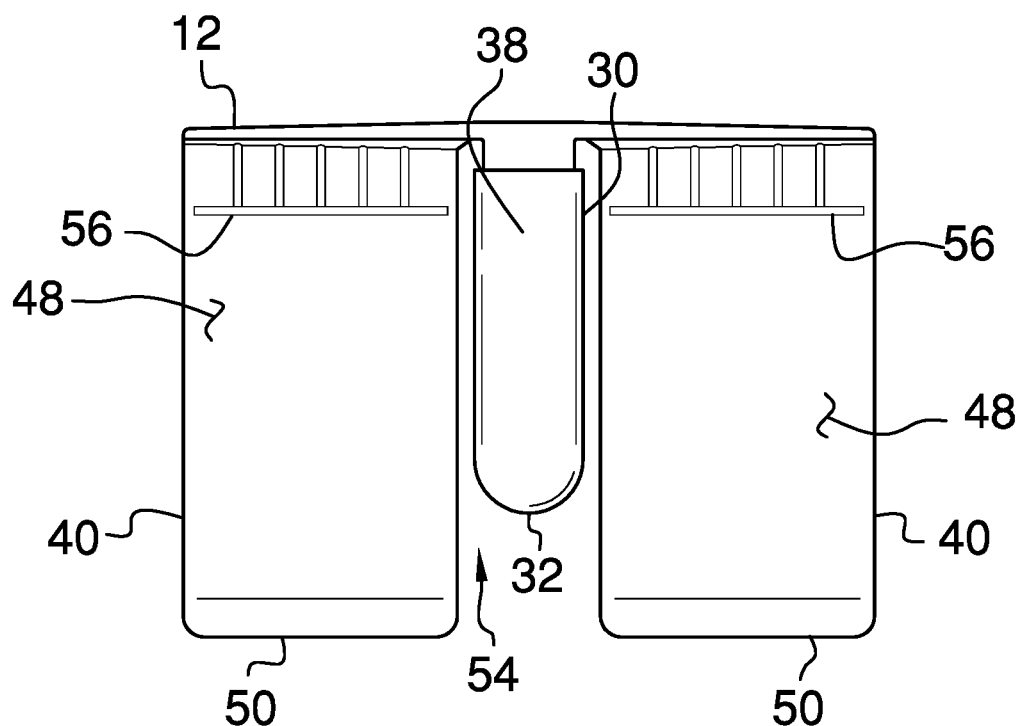
FIG. 4 is a top view of an embodiment of the disclosure.
Figure 5:
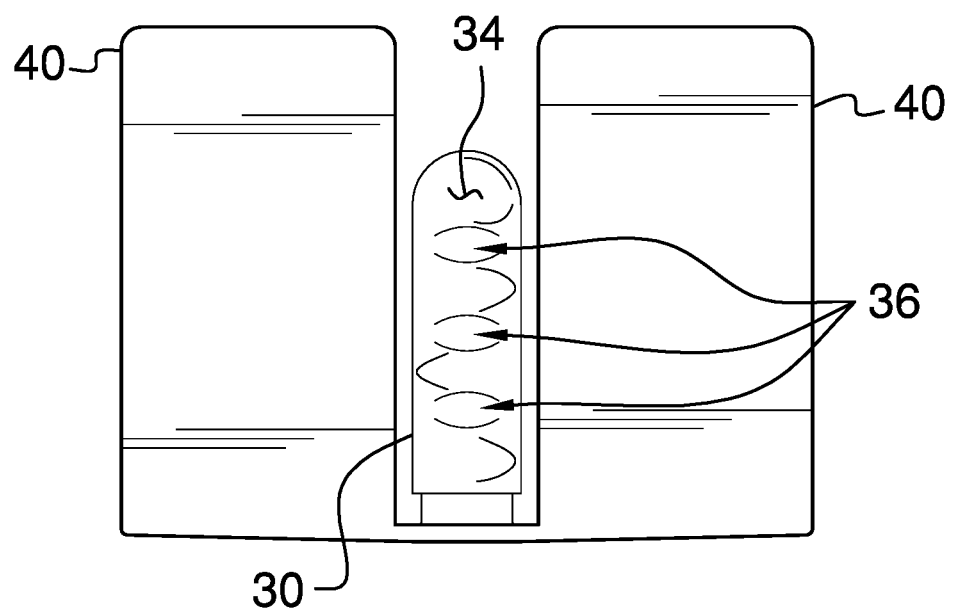
FIG. 5 is a bottom view of an embodiment of the disclosure.
Figure 6:
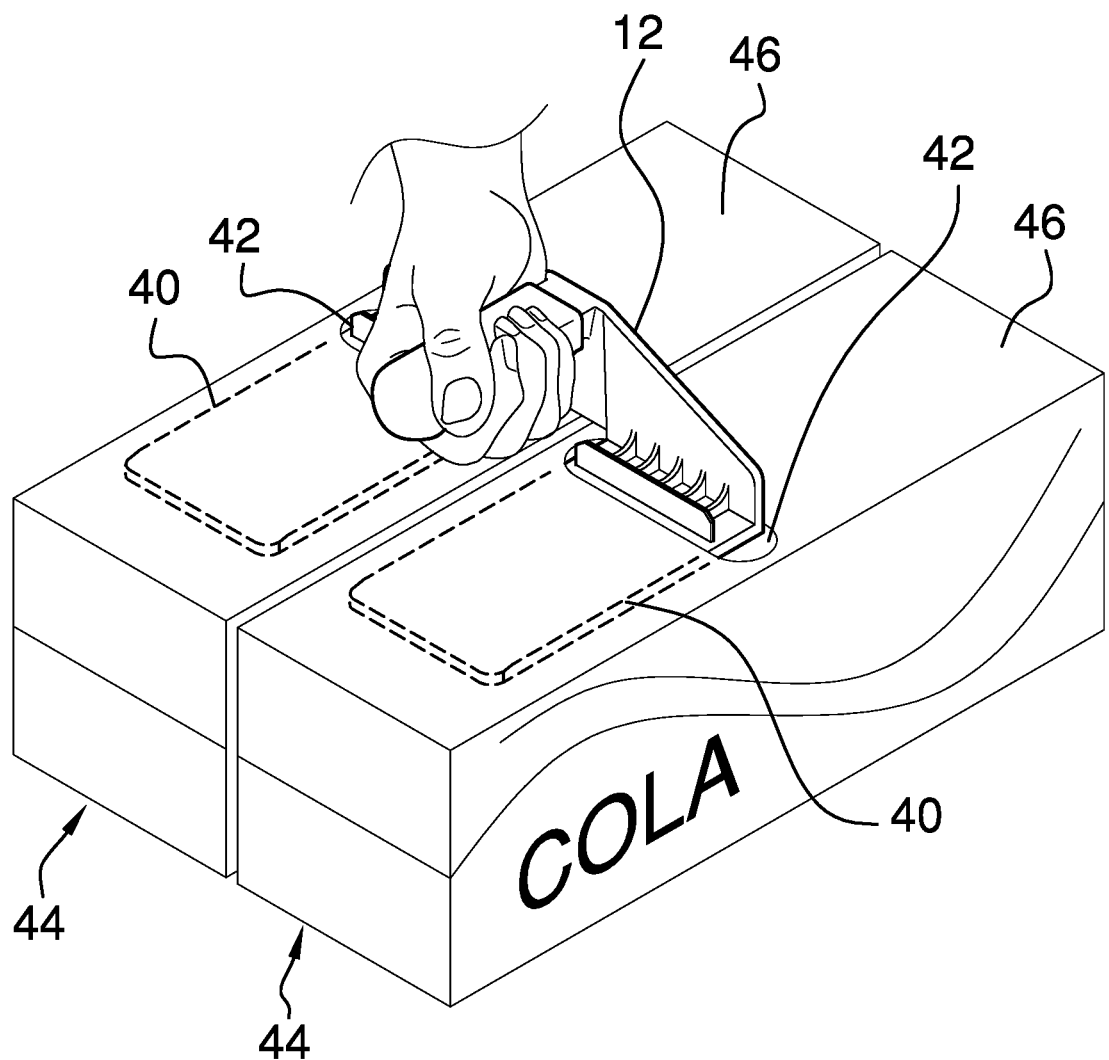
FIG. 6 is a perspective in-use view of an embodiment of the disclosure.

With reference now to the drawings, and in particular to FIGS. 1 through 6 thereof, a new carrying device embodying the principles and concepts of an embodiment of the disclosure and generally designated by the reference numeral 10 will be described.

As best illustrated in FIGS. 1 through 6, the beverage carton carrying assembly 10 generally comprises a panel 12 that has a first surface 14 and a perimeter edge 16. The perimeter edge 16 has a bottom side 18, a first lateral side 20, a second lateral side 22, a top side 24, a first sloped side 26 and a second sloped side 28. The first sloped side 26 slopes downwardly between the top side 24 and the first lateral side 20. The second sloped side 28 slopes downwardly between the top side 24 and the second lateral side 22.

A grip 30 is coupled to and extends away from the panel 12 for gripping. The grip 30 is positioned on the first surface 14 of the panel 12 and the grip 30 has a distal end 32 with respect to the panel 12. Moreover, the grip 30 is aligned with the top side 24 of the perimeter edge 16 of the panel 12. The grip 30 has a bottom surface 34 and the bottom surface 34 undulates between the distal end 32 and the first surface 14 of the panel 12 to define a plurality of gripping slots 36 for enhancing gripping the grip 30. A cushion 38 may be positioned around the grip 30 for enhancing comfort when gripping the grip 30. The cushion 38 may extend from the distal end of the grip 30 toward the first surface 14 of the panel 12 and the cushion 38 may be comprised of a resiliently compressible material.

A pair of supports 40 is each coupled to and extends laterally away from the panel 12. Each of the supports 40 is extendable through a gripping slot 42 in a respective pair of beverage cartons 44. In this way the supports 40 lift the beverage cartons 44 when the grip 30 is lifted for carrying the beverage cartons 44. A top wall 46 of the beverage cartons 44 rests on upon each of the supports 40 when the supports 40 are inserted through the gripping slot 42. Additionally, each of the beverage cartons 44 may be a twelve pack of cans, a twenty four pack of cans or any other size of cardboard beverage box.

Each of the supports 40 is positioned on the first surface 14 of the panel 12 and each of the supports 40 is aligned with the bottom side 18 of the perimeter edge 16 of the panel 12. Each of the supports 40 has a top surface 48 and a distal end 50 with respect to the first surface 14. The top surface 48 of each of the supports 40 has a sloped portion 52 that slopes downwardly at the distal end 50 of the supports 40. Additionally, the top surface 48 abuts the top wall 46 of the beverage cartons 44. The supports 40 are spaced apart from each other to define a space 54 between the supports 40 and the grip 30 is aligned with the space 54.

A pair of stops 56 is each coupled to and extends upwardly from the top surface 48 of a respective one of the supports 40. Each of the stops 56 is configured to abut a respective one of the beverage cartons 44 when the supports 40 are inserted into the gripping slot 42 in the beverage cartons 44. Each of the stops 56 is oriented to extend laterally across the respective support 40. Additionally, each of the stops 56 is positioned closer to the first surface 14 of the panel 12 than the distal end 50 of the respective support 40.

In use, the grip 30 is gripped and each of the supports 40 is slid into the gripping slot in the respective beverage carton. The grip 30 is lifted to subsequently lift and carry the pair of beverage cartons 44. In this way two beverage cartons 44 can be carried with one hand. Each of the supports 40 is slid out of the gripping slot 42 in the beverage cartons 44 when the beverage cartons 44 have been placed on a support surface.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A beverage carton carrying assembly being configured to carry a pair of beverage cartons, said assembly comprising:
   a panel;
   a grip being coupled to and extending away from said panel for gripping;
   a pair of supports, each of said supports being coupled to and extending laterally away from said panel, each of said supports being positioned below said grip, each of said supports being extendable through a gripping slot in a respective pair of beverage cartons wherein each of said supports is configured to lift the beverage cartons when said grip is lifted for carrying the beverage cartons; and
   said panel having a first surface and a perimeter edge, said perimeter edge having a bottom side, a first lateral side, a second lateral side, a top side, a first sloped side and a second sloped side, said first sloped side sloping downwardly between said top side and said first lateral side, said second sloped side sloping downwardly between said top side and said second lateral side.

2. The assembly according to claim 1, wherein said grip is positioned on said first surface of said panel, said grip having a distal end with respect to said panel, said grip being aligned with said top side of said perimeter edge of said panel, said grip having a bottom surface, said bottom surface undulating between said distal end and said first surface of said panel to define a plurality of gripping slots for enhancing gripping said grip.

3. The assembly according to claim 1, wherein each of said supports is positioned on said first surface of said panel, each of said supports being aligned with said bottom side of said perimeter edge of said panel, each of said supports having a top surface and a distal end with respect to said first surface, said top surface of each of said supports having a sloped portion that slopes downwardly at said distal end of said supports, said top surface lying on a perpendicular plane with respect to said first surface of said panel.

4. The assembly according to claim 3, further comprising a pair of stops, each of said stops being coupled to and extending upwardly from said top surface of a respective one of said supports wherein each of said stops is configured to abut a respective one of the beverage cartons when said supports are inserted into the gripping slot in the beverage cartons, each of said stops being oriented to extend laterally across said respective support, each of said stops being positioned closer to said first surface of said panel than said distal end of said respective support.

5. A beverage carton carrying assembly being configured to carry a pair of beverage cartons, said assembly comprising:
   a panel having a first surface and a perimeter edge, said perimeter edge having a bottom side, a first lateral side, a second lateral side, a top side, a first sloped side and a second sloped side, said first sloped side sloping downwardly between said top side and said first lateral side, said second sloped side sloping downwardly between said top side and said second lateral side;
   a grip being coupled to and extending away from said panel for gripping, said grip being positioned on said first surface of said panel, said grip having a distal end with respect to said panel, said grip being aligned with said top side of said perimeter edge of said panel, said grip having a bottom surface, said bottom surface undulating between said distal end and said first surface of said panel to define a plurality of gripping slots for enhancing gripping said grip;
   a pair of supports, each of said supports being coupled to and extending laterally away from said panel, each of said supports being positioned below said grip each of said supports being extendable through a gripping slot in a respective pair of beverage cartons wherein each of said supports is configured to lift the beverage cartons when said grip is lifted for carrying the beverage cartons, each of said supports being positioned on said first surface of said panel, each of said supports being aligned with said bottom side of said perimeter edge of said panel, each of said supports having a top surface and a distal end with respect to said first surface, said top surface of each of said supports having a sloped portion that slopes downwardly at said distal end of said supports, said top surface lying on a perpendicular plane with respect to said first surface of said panel; and
   a pair of stops, each of said stops being coupled to and extending upwardly from said top surface of a respective one of said supports wherein each of said stops is configured to abut a respective one of the beverage cartons when said supports are inserted into the gripping slot in the beverage cartons, each of said stops being oriented to extend laterally across said respective support, each of said stops being positioned closer to said first surface of said panel than said distal end of said respective support.

\* \* \* \* \*